July 26, 1966  R. H. BECKMAN ET AL  3,262,137
SPRING ASSEMBLIES
Filed March 3, 1964  2 Sheets-Sheet 1

INVENTORS
RONALD H. BECKMAN
RICHARD R. KNITTEL
BY
Price & Heneveld
ATTORNEYS

July 26, 1966 R. H. BECKMAN ET AL 3,262,137
SPRING ASSEMBLIES
Filed March 3, 1964 2 Sheets-Sheet 2
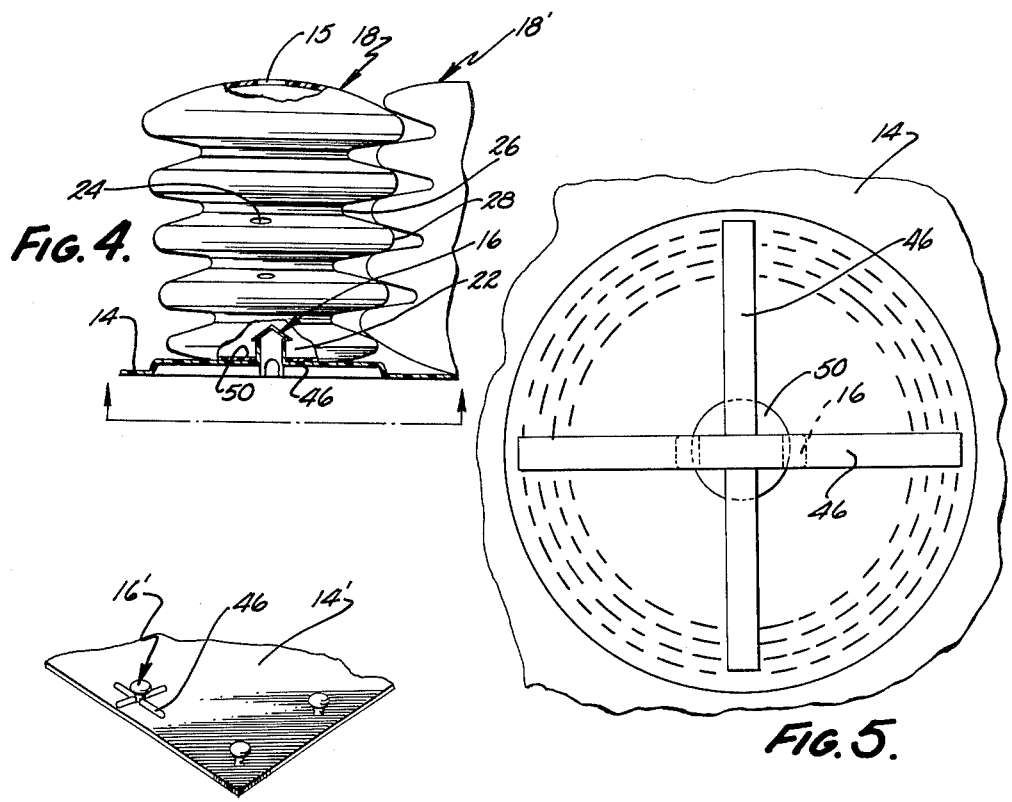
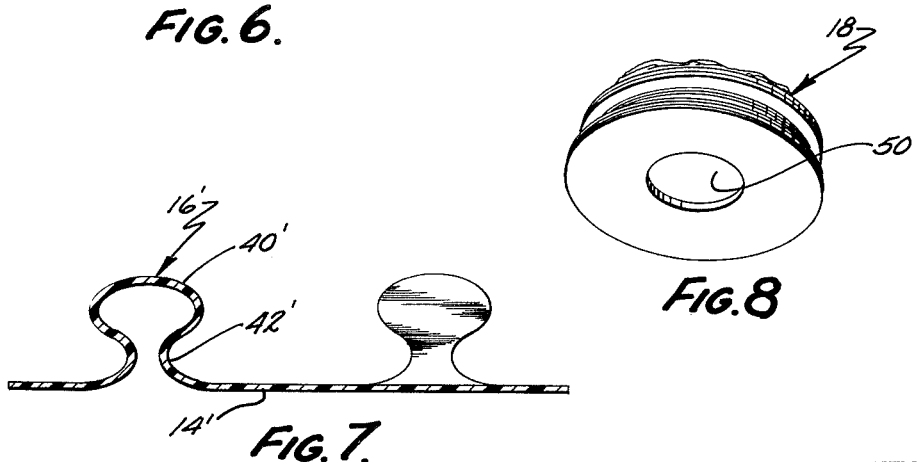
INVENTORS
RONALD H. BECKMAN
RICHARD R. KNITTEL
BY
ATTORNEYS

United States Patent Office 3,262,137
Patented July 26, 1966

3,262,137
SPRING ASSEMBLIES
Ronald H. Beckman, 27 Bank St., New York, N.Y., and Richard R. Knittel, Box 855, R.R. 1, Martinsville, N.J.
Filed Mar. 3, 1964, Ser. No. 348,926
5 Claims. (Cl. 5—353)

This invention relates to a resilient load supporting assembly, and more particularly to a vented, bellows spring cushioning assembly, especially for furniture, mattresses, cushions, automotive and general transportation seating, and more particularly to a bellows spring assembly having unique locating means for each of the plurality of bellows springs.

The employment of vented, resilient bellows springs in combination with other support components to produce a resilient load supporting bellows spring assembly results in many unique manufacturing, assembly and operational advantages. Many of these advantages are specifically set forth in U.S. patent applications, Serial No. 256,376, entitled, Molded Body Support, filed February 5, 1963, and Serial No. 348,934, entitled, Molded Spring, filed March 3, 1964. One of the important advantages of such assemblies is their controllable variable support characteristics, including control of over-all resilience and resistance to compression of an assembly under load, and even of zonal areas thereof.

Two of the most important features enabling this variation and control are (1) variable wall thickness and material characteristics of the individual springs, and (2) variable spacing of the individual springs with respect to each other in their supported relationship.

This second factor of spacing allows all springs to be located at predetermined relationships with respect to each other, and specifically with respect to the surrounding springs around each spring. The springs may be intermeshed or internested a controlled degree with each other, or spaced at controlled predetermined distances when not intermeshed. Spacing of non-intermeshed springs has a significant effect on the article support characteristics. Spacing of intermeshed springs is even more exacting and critical to control the degree of multiple action resulting from the several factors occurring with intermeshing. These factors include cumulative spring resistance to compression, friction between bellows, and interference fitting of bellows when radially expanding between overlapping adjacent bellows, as explained more specifically in the above identified patent application entitled, Molded Spring. Fractions of an inch are very significant when intermeshing bellows springs since the resilience effects are so dependent upon the bellows relationship.

A spring assembly can thereby include nonintermeshed springs at controlled varied spacing, and/or intermeshed springs at controlled varied spacing or intermesh.

Since the location of each spring is so important, the problem of achieving exact initial location of each spring on a support becomes acute during assembly. To visually determine the spacing, or to do so by instrumentation, is difficult, time consuming and often inaccurate since no specific reference points are always available. This is true since the individual springs may be tapered, may be of varied configurations and varied thickness, and may be in unsymmetrical pattern arrangements. All of these factors introduce complications preventing exact initial location of the springs in a pattern, even though the desired pattern can be predetermined with great accuracy by careful calculations.

Moreover, the process of anchoring each spring must be accomplished without disturbance of adjacent springs with the anchoring tools or equipment. Also, once the springs are specifically located, they cannot be allowed to shift laterally during usage, even hard usage, since this results in a loss of the support characteristics specifically pre-designed into the unit. These related problems, therefore, of initially exactly locating springs, of anchoring the springs without disturbance of the initial location, and of retention of the springs in their pattern over the normal period of usage, tend to prevent complete adoption of the assembly to mass-production techniques, but rather necessitate skilled labor for each article.

It is, therefore, an object of this invention to provide a bellows spring type load supporting assembly enabling exact location of individual bellows springs in any pre-calculated spring pattern, yet with complete assembling ease and rapidity. The assembling process requires no special skill, no special tools, and little time and effort, yet achieves an exact pattern of springs without fail. The assembly is readily adaptable to high speed, mass-production techniques, without loss of quality in the product, with complete accuracy of spring location, and with proper anchoring.

It is another object of this invention to provide a bellows spring locator element that may be rapidly and inexpensively fabricated by mass-production.

It is another object of this invention to provide a bellows spring support assembly capable of retaining anchored bellows springs in a nonshifting condition, while still allowing rapid assembly by workmen without special skill or tools, and with complete assurance of proper anchoring and accuracy of location.

These and other objects of this invention will become apparent upon studying the following specification in conjunction with the drawings in which:

FIG. 4 is an enlarged, elevational, partially cut-away view of bellows springs mounted on a portion of the anchoring sheet means;

FIG. 5 is a bottom view of the structure illustrated in FIG. 4;

FIG. 6 is a fragmentary perspective view of a modified form of anchoring sheet means;

FIG. 7 is an enlarged, fragmentary, elevational, sectional view of a portion of the sheet illustrated in FIG. 6;

FIG. 8 is a fragmentary, enlarged, perspective view of the bottom of one of the bellows springs.

Figure 1:
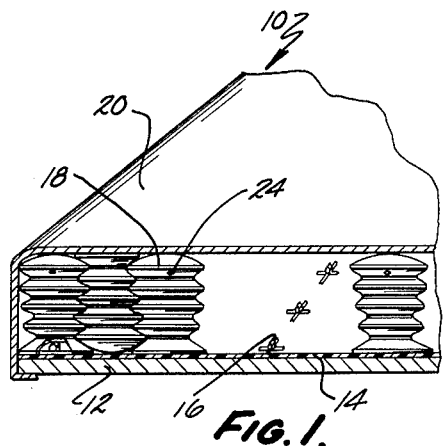
FIG. 1 is a fragmentary perspective cut-away view of one form of the novel assembly.

Referring now specifically to the drawings, the novel combination is shown in one form 10 in FIG. 1. It includes a relatively rigid support means or panel 12, a flexible anchoring sheet 14 extending over and attached to the support panel and including a plurality of spaced upward protrusions 16, a plurality of resilient, hollow, vented, compressible bellows springs 18 affixed to the support means and located on the anchoring sheet 14, and a cover means 20 extending over the top of the bellows springs, around the peripheral edge of the assembly, and anchored to panel 12. The panel and decorative cover 20 form enveloping supporting means around the springs and anchor sheet.

The support panel 12 may be of rigid or semirigid material having a generally flat or configurated support surface. The decorative cover 20 may be of cloth or plastic, may be woven or solid, or other characteristics, It has flexibility, and normally only slight, if any stretchability. It encloses the assembly for decorative, retention and supporting characteristics. This cover may be supplemented by a resilient pad of foam material, for example, positioned beneath the cover, and may be reinforced around the peripheral edge with an undulated peripheral band intermeshed with the springs as taught, for example, in patent application, Serial No. 348,927, entitled, Spring Assembly, filed March 3, 1964.

Each of the bellows springs comprises a hollow undulated column of a series of adjacent, integrally interconnected individual bellows of a resilient polymer. This polymer may be of any selected material capable of providing flexibility to the walls of the spring, allowing compression of the spring, and return of the spring to its original biased expanded state without significant permanent set. The polymer may, for example, be a low density polyethylene or some other polymer such as polypropylene, a polymer of ethylacrylate mixtures, a propylenebutadiene polymer, a butadiene, or several others. Preferably, the material is capable of being blow-molded from a central parison into a die surrounding the parison. It may also be formed by rotational casting techniques.

The hollow bellows spring defines an internal chamber which is purposely freely vented to the atmosphere through suitable vents on the upper and lower ends of the spring and/or by vents in the side wall as at 24 (FIG. 4). Preferably, the venting is through the lower end of each spring in a manner to be described hereinafter. The free venting of the internal chamber 22 to the atmosphere prevents any pneumatic interference with the wall supporting characteristics of the spring during compression and expansion of the spring.

If desired, the springs may be of varying wall thickness from one end to the other, and from the inner junctures 26 to the outer junctures 28. Such a structure is produced, for example, with the blow-molding process where the wall thickness varies inversely with the distance of that portion of the mold from the central parison being blown.

The wall thickness of the blown spring or cast spring may be varied by the amount of material introduced into the mold. For example, with blow-molding, it is varied by varying the wall thickness of the initial hollow parison to be blown and by the internal diameter of the parison with respect to the die. Wall characteristics also vary widely with the polymeric material employed in the spring. These wall variations provide excellent control of the individual spring resilience characteristics.

Preferably, the outer junctures are arcuate in configuration to form arcuate resilient hinges. These are capable of a wider angle of separation between the outwardly converging legs of the individual bellows, without permanent fiber stress resulting in the plastic to cause permanent set. With the blow-molded spring, almost the entire deflection of each spring is the result of the flexure of the outer juncture hinges, with only slight flexing occurring in the legs during spring compression under load or at the inner junctures.

Preferably, each spring is also tapered lengthwise either from one end to the other, or from the central portion to the ends or in various converging and diverging patterns from one end to the other. This variation facilitates intermeshing of adjacent springs when some are inverted, increases the stability of the intermeshed assembly, prevents accumulation of plastic of the inner hinges under compression to unduly limit the depth of compression of each spring, and has other advantages also. These are all specifically explained in the above identified patent application entitled, Molded Spring.

The axial ends of each spring may be generally flat or may, if desired, inculde a slight convexity or dome as desired. The smallest diameter end of the spring may have an enlarged base, depending upon the use to which the spring is to be put.

In the normal uncompressed state, the angle of separation of the radially outwardly convergent legs of each bellows is preferably at least 50° to provide significant depth of compression for each spring. If angles this large are used, the arcuate juncture configuration should be used to prevent permanent set in the hinge.

Each of the bellows springs may be generally circular, ovular, polygonal or of other cross-sectional configuration.

The novel locator means 14 for the bellows springs is a thin, lightweight, sheet of material, preferably of a flexible polymer, having a plurality of spaced anchor protrusions 16 located at specific positions over the extent of the sheet to form a predetermined pattern. Each of the protuberances is an integral part of the sheet. The entirety is preferably formed by pressure differential or i.e., vacuum-forming techniques. Because the finished configuration of the sheet involves reentrant surfaces, the material must have sufficient resilience to permit its withdrawal from the forming equipment. Each protuberance includes an enlarged head portion with a larger diameter, and a smaller diameter neck portion between the head and the remainder of the sheet.

Figure 3:
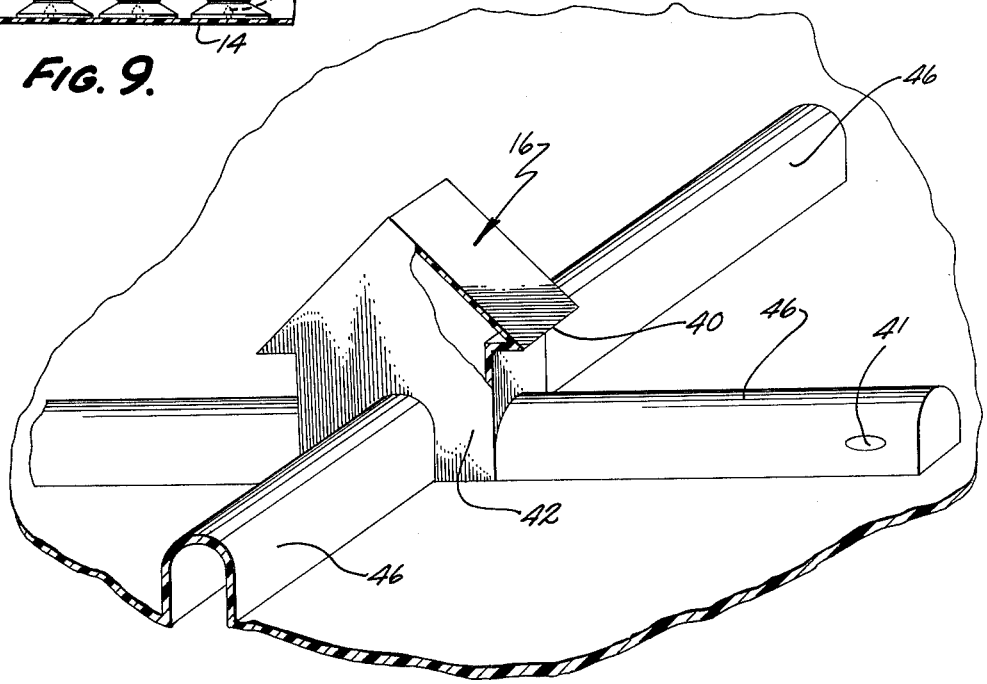
FIG. 3 is a perspective enlarged view of one portion of the novel anchoring sheet.

The particular configuration of each protuberance or of all of the protuberances on the sheet may be varied within reasonable limitations. Thus, for example, one form of protuberance is illustrated in FIG. 3 to include a configuration not unlike that of a house with overlapping eaves. The "eave" portions 40 are of substantially greater diameter than the base 42 forming the neck. The wide diameter portion tapers or converges toward the upper edge surface to serve as a lead-on or guide surface for springs in a manner to be described hereinafter.

Preferably, the sheet is also provided with a plurality of protrusions 46 around each protuberance 16, but of lesser height than protrusion 16, and of an elongated nature extending radially away from the neck of protrusion 16. These provide cooperative support means for an individual spring, to hold the spring in an elevated position above the main surface of sheet 14. This provides a unique venting means since air escape areas (FIG. 5) are formed between these elongated protrusions and between the bottom of the elevated springs and the main surface of sheet 14. These protrusions 46 are also integrally formed into the sheet by vacuum forming techniques or the equivalent. If desired, these hollow tubular portions may include venting openings 41 (FIG. 3) to allow part of all of the venting spring air to pass therethrough.

An alternative protrusion configuration is illustrated in FIGS. 6 and 7. In this modified form 14' of the anchor sheet, the protrusions are again integrally formed, but include a generally dome-shaped symmetrical configuration to form a head 40' and a neck 42'. These together serve as locator means. If desired, the elongated protrusions 46' radiating from the neck of the protrusion 16' (FIG. 6), may also be integrally formed into the sheet. The thin sheet is dependent upon the underlying support panel for load support characteristics since the sheet is thin and highly flexible. It can be attached to the panel by stapling, nailing, bonding or otherwise, either before or after the springs are attached to the sheet.

At least some of the resilient hollow bellows springs in the assembly of a plurality of springs cooperate with the protrusions on the anchor sheet to locate all of the springs. These bellows springs include an opening 50 (FIGS. 4 and 8) in the lower surface thereof, whether this be the "top" of the spring or the "bottom" of the spring in normal terminology. Some of the springs can be inverted. This opening adjacent sheet 14 receives one of the protrusions in the manner illustrated in FIG. 4. The diameter of the openings 50, at least that portion interfitting with the large diameter portions of the protrusion, has a dimension smaller than the maximum diameter portion of the protrusion head, and preferably larger than the neck of the protrusion. Consequently, interengagement of the spring and protrusion by insertion of the protrusion within the opening, requires temporary deformation, normally of the spring and possibly also of the protrusion, when the spring is "popped" into place. The upper tapered surface on the protrusion causes the deformation to proceed gradually as the spring is pushed into place.

The spring then rests around the protrusions 46, so that openings 48 remain adjacent openings 50 in the spring. This allows exhaustion of the air in the spring freely to the atmosphere when the spring is compressed. The springs may be formed with upper openings 51 to enable alternate springs to be placed in upright position and inverted position as illustrated by the two springs 18 and 18' in FIG. 4. This allows intermeshing with each other of the individual bellows of the tapered springs like those shown.

Figure 9:
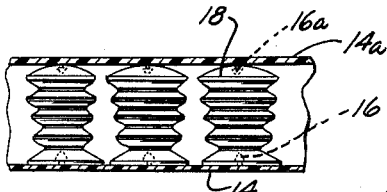
FIG. 9 is a fragmentary, sectional view of bellows springs attached between a pair of locator sheets to form a flexible sandwich.

Also, it is advantageous in some situations to have a locator sheet both above and below the springs, i.e., on both ends. Conceivably, in some instances, the sheet need only be on the spring ends opposite the panel. Or one sheet could be wrapped over both ends of the springs to be interengaged with one or both of the springs. When locator sheets 14 and 14a (FIG. 9) are positioned on both ends of the springs, the assembly is a flexible self-contained sandwich. The springs 18 have protrusions 16 and 16a protruding into both ends through openings. This flexible sandwich is extremely useful during shipping. The assembly can sometimes be compressed or bent or curved as necessary, either for shipping convenience or on its final support. Yet, the springs are always retained in proper relationship. This enables factory assembly of the locator sheet or sheets and the springs, with completed assembly occurring somewhere else.

Figure 2:
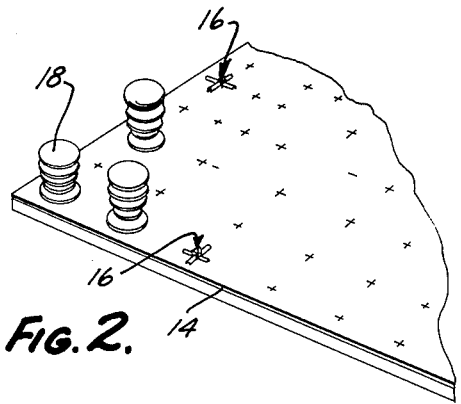
FIG. 2 is a fragmentary perspective view of the novel anchoring sheet means attached to a support panel, with representative bellows springs attached.

During actual assembly operations, a particular anchoring sheet 14 with a desired pattern of protrusions (a representative pattern is illustrated by the X's in FIG. 2) is chosen to suit the size of the particular support panel or equivalent, and to suit the intended purpose. The pattern of the protrusions is predetermined by calculations. Some protrusions may be evry close together to cause a tight intermesh of springs and thus limited compressibility. Some may be more widely spaced to allow lesser intermeshing of adjacent springs. Some may be spaced widely enough to eliminate intermeshing entirely, and some may be so widely spaced as to create a definite spacing between springs. The pattern over any particular zone of the article may be controlled as well as the pattern over the entire article. In some cases, only some of the springs need be anchored and located on the protrusions, since intermediate interengaged springs will be automatically located by the surrounding springs interengaged with the protrusions.

High speed assembly is readily achieved simply by (1) proper selection of a sheet with pre-calculated protrusion spacings, (2) popping the bellows springs of selected individual spring characteristics onto the pattern of protrusions to anchor and locate the springs, (3) securement of the sheet to the support layer by any suitable means such as by an adhesive, by stapling, or any equivalent, and (4) enveloping the assembly with a cover sheet. The assembly of operation is rapid and effective even for springs to be intermeshed. The anchor sheet is curved to allow the springs to be independently attached, and then returned to its intended generally flat orientation to cause the springs to to intermesh. The cover sheet may be secured at its peripheral edge to the panel 12, or may be wrapped completely around the assembly. If desired, tufting ties may be inserted through the assembly for decorative purposes. The assembly is then ready for use in automotive seating, or as a mattress, or as furniture cushioning, or as a throw cushion, or in other applications.

The vacuum formed sheet can be mass-produced according to predesigned patterns using conventional vacuum forming or equivalent techniques. The bellows springs are also mass-produced using blow-molding or rotational casting techniques. The support assembly can also be mass assembled.

The assembling operation requires no special skills, and can be achieved rapidly, easily and in a foolproof manner. The over-all assembly possesses the advantageous characteristics of bellows springs. It achieves accurate location of each spring in the pattern assembly without the necessity of visual observations of spring spacing or the use of instrumentation for this purpose. It anchors the springs in a located position. It prevents lateral shifting or vertical disconnection. It retains the springs in located positions during the normal period of usage, even under adverse conditions.

Various other advantages will readily occur to those in the art upon understanding the foregoing principles and depicted forms of the invention. Also, certain obvious modifications will readily occur to those in the art to suit a particular purpose, manufacturing technique, assembling technique or the like, while employing the concepts taught herein. These obvious modifications are deemed to be part of this invention which is to be limited only by the scope of the appended claims and the reasonably equivalent structures to those defined therein.

We claim:

1. A bellows spring assembly comprising: a support means; a flexible polymeric locator sheet on said support means; said sheet having a pattern of a plurality of locator protrusions; each of said protrusions having a smaller diameter neck and a larger diameter head; a plurality of elongated protuberances extending away from the neck of each of said protrusions; and a plurality of hollow resilient bellows springs on said support means, each interfitting with one of said protrusions and resting on said protuberances; said springs each having an end opening receiving one of said protrusions and having a diameter larger than said neck and smaller than said head to anchor the spring; and the interfit of each spring on its protuberances forming vent openings at the bottom of the hollow spring to vent the spring to the atmosphere.

2. A resilient bellows spring assembly comprising: a plurality of resilient, hollow, vented bellows springs; a flexible, preformed spring locating and anchoring sheet; said sheet having a pattern of integral spaced protrusions, each having a neck and a head; at least some of said springs having an opening in an end thereof, the diameter of said opening being smaller than the width of said heads; said openings being fitted over said protrusions to interengage said springs and sheet for locating and anchoring said springs; and enveloping supporting means around said springs and sheet.

3. The assembly in claim 2 wherein said sheet also has a plurality of integral, protrusion fingers extending radially from each protrusion and of lesser height than the protrusion to elevate the bellows spring from the sheet and create venting outlets therebetween for the hollow springs.

4. A resilient, load supporting bellows spring assembly of controlled resilience comprising: a support panel; a preformed flexible, polymeric, spring-anchoring and locating sheet attached to and overlying said panel; said sheet having a plurality of integral preformed anchoring and locating protrusions extending away from said panel; said protrusions being spaced in a predetermined pattern on said sheet and panel; each protrusion having a smaller diameter neck and a larger diameter head; a plurality of resilient, hollow bellows springs arranged on said sheet; each of said springs comprising a stack of integrally interconnected individual bellows of controlled wall characteristics rendering cushioned support characteristics; each of said springs being freely vented to the atmosphere to prevent any pneumatic interference in operation; each spring being compressible and being biased to an expanded state; at least a share of said bellows springs being arranged in said pattern for cooperation with said protrusions; each of the cooperative bellows springs including an opening on the end thereof adjacent said sheet; and said openings each having a diameter smaller than the corresponding protrusion head to require temporary deformation of material to interfit the spring and protrusion; said cooperative springs being engaged with and anchored by said protrusions by fit of said protrusions within said openings; and a cover means over said plurality of springs.

5. A flexible, compressible, load supporting bellows spring sandwich assembly, comprising: a pair of spaced flexible polymeric locator sheets, and a plurality of resilient bellows springs therebetween; said springs including axial openings on both ends; said sheets having integral protrusions extending toward the opposite sheet and into the openings in said springs; each of said protrusions having a neck adjacent the sheet, of a diameter smaller than the diameter of the spring opening into which it is fitted, and having an enlarged head of a diameter larger than the diameter of the opening into which it is fitted; and spring elevating means on one of said sheets at each of the enlarged heads of that one sheet creating venting means to the interior of said springs.

References Cited by the Examiner

UNITED STATES PATENTS

| | | | |
|---|---|---|---|
| 2,150,747 | 3/1939 | Naulty | 5—348 |
| 2,350,711 | 6/1944 | Amos | 5—348 |
| 2,646,166 | 7/1953 | Paffen et al. | 206—654 |
| 2,686,006 | 8/1954 | Hasselquist | 5—348 |
| 2,704,600 | 3/1955 | Despres | 206—65 |
| 2,792,112 | 5/1957 | Ellis | 206—65 |
| 2,818,974 | 1/1958 | Talbot | 206—65 |
| 2,897,520 | 8/1959 | Bradford | 5—348 |
| 3,081,992 | 3/1963 | Kessler | 267—1 |
| 3,171,691 | 3/1965 | Buehrig | 5—345 |
| 3,201,111 | 8/1965 | Afton | 267—1 |

FOREIGN PATENTS 1,148,718   5/1963   Germany.

CASMIR A. NUNBERG, *Primary Examiner.*

FRANK B. SHERRY, *Examiner.*